United States Patent
Kim et al.

(10) Patent No.: US 8,909,388 B1
(45) Date of Patent: Dec. 9, 2014

(54) DRIVING DEVICE AND METHOD USING IMAGING DEVICE SIGNAL AND NAVIGATION SIGNAL

(71) Applicant: Hyundai Motor Company, Seoul (KR)

(72) Inventors: Seon Su Kim, Gyeonggi-do (KR); Seung-Chang Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/143,416

(22) Filed: Dec. 30, 2013

(30) Foreign Application Priority Data

Aug. 9, 2013 (KR) .................. 10-2013-0094664

(51) Int. Cl.
*G01C 21/26* (2006.01)
(52) U.S. Cl.
CPC ..................................... *G01C 21/26* (2013.01)
USPC ............................................................ 701/1
(58) Field of Classification Search
USPC ............................................................ 701/1
See application file for complete search history.

(56) References Cited

U.S. PATENT DOCUMENTS

| | | | | |
|---|---|---|---|---|
| 5,586,028 A * | 12/1996 | Sekine et al. | .......... | 701/1 |
| 5,926,117 A * | 7/1999 | Gunji et al. | .......... | 340/988 |
| 6,252,544 B1 * | 6/2001 | Hoffberg | .......... | 342/357.31 |
| 6,370,475 B1 * | 4/2002 | Breed et al. | .......... | 701/301 |
| 6,405,132 B1 * | 6/2002 | Breed et al. | .......... | 701/301 |
| 7,054,744 B2 * | 5/2006 | Hirose et al. | .......... | 701/417 |
| 7,353,110 B2 * | 4/2008 | Kim | .......... | 701/438 |
| 7,664,599 B2 * | 2/2010 | Yamamoto | .......... | 701/468 |
| 2008/0143833 A1 * | 6/2008 | Yanai et al. | .......... | 348/148 |
| 2009/0112463 A1 * | 4/2009 | Yamane et al. | .......... | 701/209 |
| 2009/0326809 A1 * | 12/2009 | Colley et al. | .......... | 701/208 |
| 2010/0145611 A1 * | 6/2010 | Tokue et al. | .......... | 701/208 |
| 2010/0305810 A1 * | 12/2010 | Tan et al. | .......... | 701/35 |
| 2012/0022761 A1 * | 1/2012 | Matsuda | .......... | 701/87 |
| 2012/0130611 A1 * | 5/2012 | Al Alam et al. | .......... | 701/70 |
| 2014/0139655 A1 * | 5/2014 | Mimar | .......... | 348/77 |

FOREIGN PATENT DOCUMENTS

| | | |
|---|---|---|
| JP | 2005-145403 A | 6/2005 |
| JP | 4295298 B2 | 7/2009 |
| JP | 2010-255718 A | 11/2010 |
| JP | 2011198030 A | 10/2011 |
| KR | 10-2000-0019325 | 4/2000 |
| KR | 10-2011-0033582 | 3/2011 |
| KR | 10-2012-0035263 A | 4/2012 |

* cited by examiner

*Primary Examiner* — Thomas Tarcza
*Assistant Examiner* — Alex C Dunn
(74) *Attorney, Agent, or Firm* — Edwards Wildman Palmer LLP; Peter F. Corless

(57) ABSTRACT

A driving device and method based on a front image and a navigation system are provided. The driving method includes receiving, by a controller, an image measured by a gyro sensor and an imaging device and calculating the condition of the road ahead. The controller determines the road condition from a navigation map which corresponds to the location received from a GPS and determines whether the road condition calculated by the gyro sensor and the imaging device and the road condition read out from the navigation map are the same. The method further includes operating, by the controller, a vehicle in a first driving mode corresponding to the condition of the road ahead based on the GPS and the navigation map, when the road condition calculated by the gyro sensor and the imaging device and the road condition read out from the navigation map are substantially the same.

11 Claims, 5 Drawing Sheets

DRIVING DEVICE AND METHOD USING IMAGING DEVICE SIGNAL AND NAVIGATION SIGNAL

CROSS-REFERENCE TO RELATED APPLICATION

This application claims priority to and the benefit of Korean Patent Application No. 10-2013-0094664 filed in the Korean Intellectual Property Office on Aug. 9, 2013, the entire contents of which are incorporated herein by reference.

BACKGROUND (a) Field of the Invention

The present invention relates to a driving device that uses a navigation system. More particularly, the present invention relates to driving device and method based on a forward image and a navigation system which control driving of a vehicle, using an imaging device and a gyro sensor.

(b) Description of the Related Art

Recently, vehicles are being equipped with various electronic devices for passenger convenience. Electronic devices such as navigation systems and hands-free system for mobile phones are mounted within vehicles and other electronic devices known to be mounted within vehicles such as a radio system and an air-conditioning system.

The navigation system is being widely used by many drivers. However, the navigation system operates based on global positioning system (GPS) information, causing error in navigation guide due to failing to receive the location from the GPS while traveling in a tunnel or other places where a signal is not received from the GPS. Further, the navigation system may fail to provide exact road guide on new roads, when the navigation system is not updated.

The above information disclosed in this section is only for enhancement of understanding of the background of the invention and therefore it may contain information that does not form the prior art that is already known in this country to a person of ordinary skill in the art.

SUMMARY

The present invention provides driving device and method based on a forward image and a navigation system having advantages of controlling shifting by combining information obtained by a gyro sensor and an imaging device, and GPS and map information.

An exemplary embodiment of the present invention provides a driving device based on a forward image and navigation, which may include: a map storing unit that stores a navigation map including road conditions and geographic information; a GPS that calculates and outputs the current location in response to a GPS satellite signal; an imaging device that obtains photographs of the front area of a vehicle; a gyro sensor that senses the inclination of a vehicle; a timer that determines time; a mode switch controller that calculates the condition of the road ahead based on the images measured by the gyro sensor and the imaging device, reads and compares the road condition on the navigation map that corresponds to the location received from the GPS, and operates the vehicle to turn in a first driving mode that corresponds to the condition of the road ahead based on the GPS and the navigation map, when the road condition calculated by the gyro sensor and the imaging device and the road condition read from the navigation map are substantially the same, as the result of comparison; and a shifting unit that shifts based on operation of the mode switch controller.

The mode switch controller may be configured to shift a second driving mode based on the road condition calculated by the gyro sensor and the imaging device, when the road condition calculated by the gyro sensor and the imaging device and the road condition read out from the navigation map are different. In addition, the mode switch controller may be configured to calculate the condition of the road ahead based on the image measured by the gyro sensor and the imaging device at a first cycle in the first driving mode, shift by reading out and comparing the road condition on the navigation map that corresponds to the location received from the GPS, and shift at a second cycle shorter than the first cycle in the second driving mode.

Another exemplary embodiment of the present invention provides a driving method based on a forward image and a navigation system, which may include: receiving an image measured by a gyro sensor and a imaging device and calculating the condition of the road ahead, by a mode switch controller; reading out the road condition on a navigation map that corresponds to the location received from a GPS, by the mode switch controller; determining whether the road condition calculated by the gyro sensor and the imaging device and the road condition read out from the navigation map are substantially the same, by the mode switch controller; and operating a vehicle in a first driving mode that corresponds to the condition of the road ahead based on the GPS and the navigation map, by the mode switch controller, when the road condition calculated by the gyro sensor and the imaging device and the road condition read out from the navigation map are substantially the same.

The method may further include shifting, by a shifting unit that is executed by the mode switch controller. In addition, the method may further include shifting to a second driving mode based on the road condition calculated by the gyro sensor and the imaging device, by the mode switch controller, when the road condition calculated by the gyro sensor and the imaging device and the road condition read out from the navigation map are different.

The mode switch controller may be configured to calculate the condition of the road ahead based on the image measured by the gyro sensor and the imaging device in the first cycle in the first driving mode, shift by reading out and comparing the road condition on the navigation map which corresponds to the location received from the GPS, and shift in a second cycle shorter than a first cycle in the second driving mode.

In an exemplary embodiment of the present invention, by performing shifting by combining two items of information obtained by a gyro sensor and an imaging device and obtained from a GPS and a map, it may be possible to shift corresponding to the road condition more accurately, even when there is an error in the navigation information.

Further, in an exemplary embodiment of the present invention, it may be possible to prepare shifting and cruise control modes of a vehicle based on the more accurately recognized information on the road ahead, and to provide riding comfort and maximize energy efficiency of the vehicle.

Additionally, it may be possible to shift to a driving mode that corresponds to the road condition even when the map information is incorrect, and it may be possible to shift to a driving mode that corresponds to the road condition despite weather conditions.

DETAILED DESCRIPTION

Figure 1:
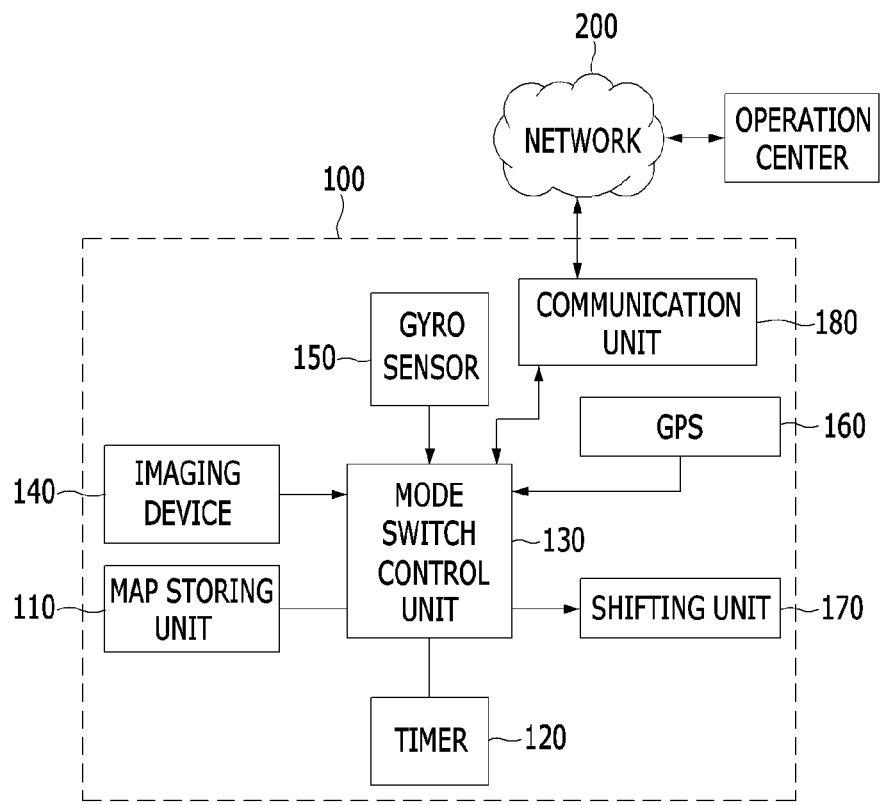
FIG. 1 is an exemplary diagram illustrating the configuration of a driving device based on a forward image and a navigation system according to an exemplary embodiment of the present invention.
Figure 2:
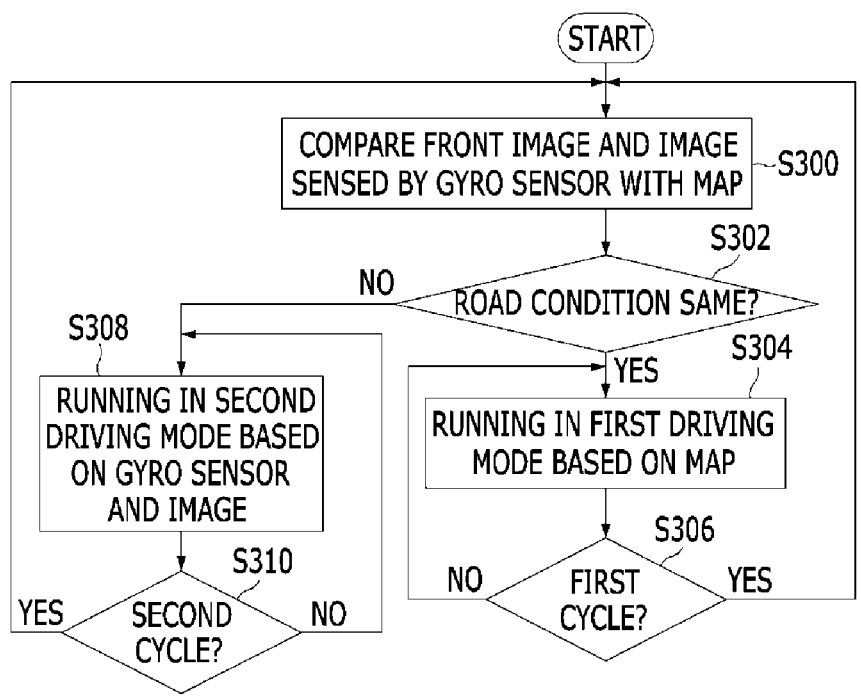
FIG. 2 is an exemplary flowchart illustrating a method of a driving device based on a forward image and a navigation system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings. As those skilled in the art would realize, the described exemplary embodiments may be modified in various different ways, all without departing from the spirit or scope of the present invention. The configurations are optionally shown in the drawings for the convenience of description and the present invention is not limited to the drawings.

FIG. 1 is an exemplary diagram illustrating the configuration of a driving device based on a forward image and a navigation system according to an exemplary embodiment of the present invention. Referring to FIG. 1, a driving device using a forward image and a navigation system according to an exemplary embodiment of the present invention may include an imaging device 140, a map storing unit 110, a GPS 160, a gyro sensor 150, a timer 120, a mode switch controller 130, a shifting unit 170, and a communication unit 180. The plurality of units may be executed by the mode switch controller 130.

The communication unit 180 may be configured to communicate with an operation center 300 via a network 200. The map storing unit 110 may be configured to store a navigation map that includes road conditions and geographic information, for example, the information on the degree of curve or inclination of roads. The GPS 160 may be configured to calculate and output the current location in response to a GPS signal. The imaging device 140 may be configured to obtain an image of the forward area. The gyro sensor 150 may be mounted on a vehicle and may be configured to sense the inclination of the vehicle. The timer 120 may be configured to determine time.

The mode switch controller 130 may be configured to calculate the road ahead from a measured image by operating the gyro sensor 150 and the imaging device 140, read out (e.g., determine) the road condition on the navigation map which corresponds to the location received from the GPS 160 and compare the road conditions, and operate the vehicle in a first driving mode that corresponds to the condition of the road ahead based on the GPS 160 and the navigation map, when the road condition calculated by the gyro sensor 150 and the imaging device 140 and the road condition read out from the navigation map are substantially the same.

Further, the mode switch controller 120 may be configured to shift into a second driving mode based on the road condition calculated by the gyro sensor 150 and the imaging device 140, when the road condition calculated by the gyro sensor 150 and the imaging device 140 and the road condition read out from the navigation map are different. The mode switch controller 130 may be configured to calculate the condition of the road ahead from the image measured by the gyro sensor 150 and the imaging device 140 in the first cycle in the first driving mode, execute shifting by reading out and comparing the road condition on the navigation map which corresponds to the location received from the GPS 160, and execute shifting in the second cycle shorter than the first cycle in the second driving mode. The shifting unit 170 may be configured to shift in accordance with control of the mode switch controller 130 and may be configured to perform cruise control or shifting control according to the curve or the inclination of a road.

The operation of the driving device based on a forward image and a navigation system which has the configuration according to an exemplary embodiment of the present invention is described hereafter.

The GPS 160 may be configured to calculate the current location in response to a GPS signal and output the location to the mode switch controller 130. The imaging device 140 may be configured to obtain and output an image of the road ahead to the mode switch controller 130 and the gyro sensor 150 may be mounted on a vehicle and may be configured to sense the inclination of the vehicle. If necessary, the imaging device 140 and the gyro sensor 150 may be operated in a predetermined cycle in accordance with operation of the mode switch controller 130.

Figure 4:
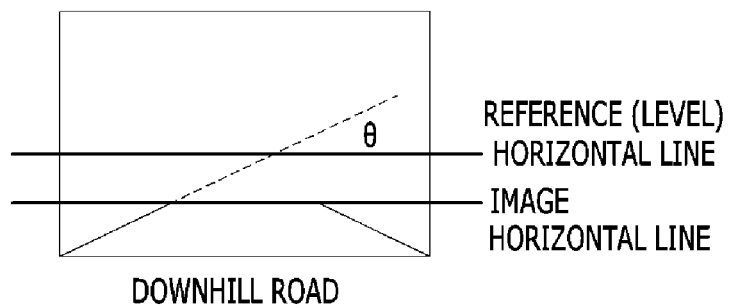
Figure 5:
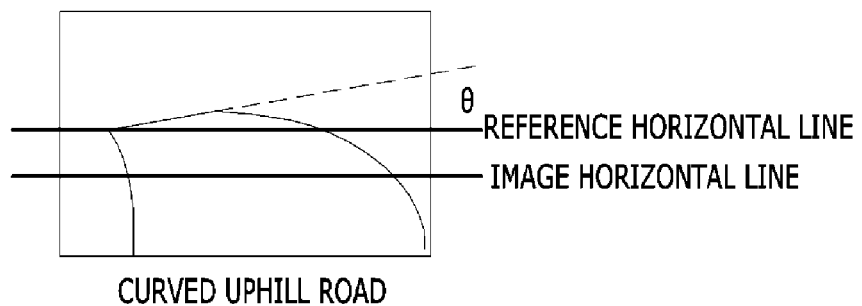

The mode switch controller 130 may be configured to calculate the condition of the road ahead based on the image measured by the gyro sensor 150 and the imaging device 140. Further, the mode switch controller 130 may be configured to determine in advance downhill road/uphill road/curvature from the image on the front-facing imaging device 140 disposed on the vehicle and may be configured to estimate the forward high/low/curvature by comparing the images with a calibrated level horizontal line of the imaging device. The information (high/low/curvature) obtained from the forward image may be corrected into the information of the gyro sensor 150 as shown in FIGS. 3 to 5.

Figure 3:
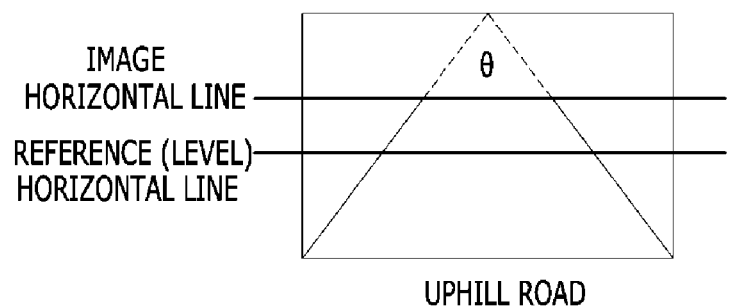
FIGS. 3 to 5 are exemplary diagrams illustrating a concept of determining high/low/curvature of a driving device based on a forward image and a navigation system according to an exemplary embodiment of the present invention.

Referring to FIG. 3, the image horizontal line is higher than the reference horizontal line for an uphill road, while the image horizontal line is lower than the reference horizontal line for a downhill road. Further, referring to FIG. 5 the image horizontal line is higher than the reference horizontal line and also bends for a curved uphill road. The condition of the road ahead may be determined by determining the image and the inclination sensed by the gyro sensor 150.

The mode switch controller 130 may be configured to determine the road condition from the navigation map which corresponds to the location received from the GPS 160 from the map storing unit 110 (S300). Then, the mode switch controller 130 may be configured to determine whether the road condition calculated by the gyro sensor 150 and the imaging device 140 and the road condition determined from the navigation map are substantially the same (S302).

When the road condition calculated by the gyro sensor 150 and the imaging device 140 and the road condition determination from the navigation map are substantially the same, the mode switch controller 130 may be configured to operate the vehicle in the first driving mode that corresponds to the condition of the road ahead based on the GPS 160 and the navigation map (S304). Then, the shifting unit 170, executed by the mode switch controller 130, may be configured to shift based on a control signal from the mode switch controller 130 (S304). The mode switch controller 130 may be configured to determine whether the first cycle is reached in the first driving mode with reference to the timer 120 (S306). When the first cycle is not reached, the vehicle may be maintained in the first driving mode, and when the first cycle is reached, the mode switch controller 130 may be configured to repeat the process from the step S300.

Further, the mode switch controller 120 may be configured to shift into a second driving mode based on the road condition calculated by the gyro sensor 150 and the imaging device 140, when the road condition calculated by the gyro sensor 150 and the imaging device 140 and the road condition determined from the navigation map are different (S308). The mode switch controller 130 may be configured to determine whether the second cycle is reached in the second driving mode with reference to the timer 120 (S310). When the first cycle is not reached, the vehicle may be maintained in the first driving mode, and when the first cycle is reached, the mode switch controller 130 may be configured to repeat the process from the step S300. Shifting may be controlled in the second cycle shorter (e.g., for a shorter period of time) than the first cycle in the second driving mode, allowing correct running to be performed based on the imaging device when there is an error in the navigation map information.

Furthermore, it may be possible to obtain weather information from the image and to perform deceleration in rainy or snowy weather with reference to the weather information. It may also be possible to transmit image information to the operation center 300 and the operation center 300 may update the traffic information by comparing the navigation map information and the information from the imaging device and may obtain the information regarding weather (e.g., rain and snow) and a fire (e.g., a vehicle fire ahead) based on the front/side/rear images. The driving assistant information may be made detailed by cooperation of the operation center 300 and the communication unit 180. Additionally, it is possible to prepare shifting control and cruise control modes of the vehicle in advance based on the obtained road geographical information and weather information and the information may be used for a vehicle control technology for custom-fit driving such as a sport mode of a vehicle.

As described above, in an exemplary embodiment of the present invention, it may be possible to perform shifting control by combining information obtained from a gyro sensor and an image and the information obtained from the GPS and the map, and to prepare shifting control and cruise control modes of a vehicle based on the recognized information on the road ahead. Accordingly, it may be possible to provide improved riding comfort and maximize energy efficiency of the vehicle. Further, it may be possible to shift to a driving mode that corresponds to the road condition even when the map information is incorrect, and to shift to a driving mode that corresponds to the road condition even in bad weather.

Moreover, if necessary, the mode switch controller may perform shifting control or accelerating/decelerating control in correspondence to weather or a fire based the imaging device in the second driving mode.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

DESCRIPTION OF SYMBOLS

110: map storing unit
120: timer
130: mode switch controller
140: imaging device
150: gyro sensor
160: GPS
170: shifting unit
180: communication unit

What is claimed is:

1. A driving device based on a forward image and a navigation system, comprising;
   a map storing unit configured to store a navigation map that includes road conditions and geographic information;
   a GPS configured to calculate and output the current location in response to a GPS satellite signal;
   an imaging device configured to obtain an image of a front area of a vehicle;
   a gyro sensor configured to sense the inclination of the vehicle;
   a timer configured to determine time;
   a controller configured to:
      calculate the condition of the road ahead from the images measured by the gyro sensor and the imaging device;
      determine and compares the road condition from the navigation map that corresponds to the location received from the GPS; and
      operate the vehicle to turn in a first driving mode that corresponds to the condition of the road ahead based on the GPS and the navigation map, when the road condition calculated by the gyro sensor and the imaging device and the road condition read out from the navigation map are substantially the same, as the result of the comparison; and a shifting unit configured to shift based on a control signal from the controller.

2. The device of claim 1, wherein the controller is configured to shift into a second driving mode based on the road condition calculated by the gyro sensor and the imaging device, when the road condition calculated by the gyro sensor and the imaging device and the road condition determination from the navigation map are different.

3. The device of claim 2, wherein the controller is configured to:
calculate the condition of the road ahead from the image measured by the gyro sensor and the imaging device at a first cycle in the first driving mode;
shift by determining and comparing the road condition on the navigation map which corresponds to the location received from the GPS; and
shift at a second cycle shorter than the first cycle in the second driving mode.

4. A driving method based on a forward image and navigation, comprising:
receiving, by a controller, an image measured by a gyro sensor and an imaging device and calculating the condition of the road ahead;
determining, by the controller, the road condition on a navigation map which corresponds to the location received from a GPS;
determining, by the controller, whether the road condition calculated by the gyro sensor and the imaging device and the road condition determination from the navigation map are substantially the same; and
operating, by the controller, a vehicle in a first driving mode that corresponds to the condition of the road ahead based on the GPS and the navigation map, when the road condition calculated by the gyro sensor and the imaging device and the road condition read out from the navigation map are substantially the same.

5. The method of claim 4, further comprising:
performing, by the controller, shifting control to a second driving mode based on the road condition calculated by the gyro sensor and the imaging device, when the road condition calculated by the gyro sensor and the imaging device and the road condition read out from the navigation map are different.

6. The method of claim 5, further comprising:
calculating, by the controller, the condition of the road ahead from the image measured by the gyro sensor and the imaging device in the first cycle in the first driving mode;
shifting, by the controller, by determining and comparing the road condition on the navigation map which corresponds to the location received from the GPS; and
shifting, by the controller, in a second cycle shorter than a first cycle in the second driving mode.

7. The method of claim 6, further comprising:
shifting or accelerating/decelerating, by the controller, based on weather or a fire from the road condition calculated by the imaging device in the second driving mode.

8. A non-transitory computer readable medium containing program instructions executed by a controller, the computer readable medium comprising:
program instructions that receive an image measured by a gyro sensor and an imaging device and calculating the condition of the road ahead;
program instructions that determine the road condition on a navigation map which corresponds to the location received from a GPS;
program instructions that determine whether the road condition calculated by the gyro sensor and the imaging device and the road condition determination from the navigation map are substantially the same; and
program instructions that operate a vehicle in a first driving mode that corresponds to the condition of the road ahead based on the GPS and the navigation map, when the road condition calculated by the gyro sensor and the imaging device and the road condition read out from the navigation map are substantially the same.

9. The non-transitory computer readable medium of claim 8, further comprising:
program instructions that perform shifting control to a second driving mode based on the road condition calculated by the gyro sensor and the imaging device, when the road condition calculated by the gyro sensor and the imaging device and the road condition read out from the navigation map are different.

10. The non-transitory computer readable medium of claim 9, further comprising:
program instructions that calculate the condition of the road ahead from the image measured by the gyro sensor and the imaging device in the first cycle in the first driving mode;
program instructions that shift by determining and comparing the road condition on the navigation map which corresponds to the location received from the GPS; and
program instructions that shift in a second cycle shorter than a first cycle in the second driving mode.

11. The non-transitory computer readable medium of claim 10, further comprising:
program instructions that shift or accelerate/decelerate, by the controller, based on weather or a fire from the road condition calculated by the imaging device in the second driving mode.

* * * * *